(12) United States Patent
Singh et al.

(10) Patent No.: US 8,138,912 B2
(45) Date of Patent: *Mar. 20, 2012

(54) APPARATUS AND METHOD FOR PROVIDING A TASK REMINDER BASED ON TRAVEL HISTORY

(75) Inventors: Munindar P. Singh, Cary, NC (US); Mona Singh, Cary, NC (US)

(73) Assignee: Ektimisi Semiotics Holdings, LLC, Portsmouth, NH (US)

( * ) Notice: Subject to any disclaimer, the term of this patent is extended or adjusted under 35 U.S.C. 154(b) by 294 days.

This patent is subject to a terminal disclaimer.

(21) Appl. No.: 12/409,854

(22) Filed: Mar. 24, 2009

(65) Prior Publication Data

US 2009/0191895 A1    Jul. 30, 2009

Related U.S. Application Data

(63) Continuation of application No. 11/536,306, filed on Sep. 28, 2006, now Pat. No. 7,528,713.

(51) Int. Cl.
 *G08B 1/08* (2006.01)
(52) U.S. Cl. ........... 340/539.11; 340/539.1; 340/539.13; 340/309.7; 340/457; 340/825.49; 340/825.69
(58) Field of Classification Search ............. 340/539.11, 340/539.13, 539.1, 457, 573.1, 825.49, 825.69, 340/309.7; 342/357.06, 357.1; 455/456, 455/456.1; 718/102
See application file for complete search history.

(56) References Cited

U.S. PATENT DOCUMENTS

| | | | |
|---|---|---|---|
| 5,938,721 A | 8/1999 | Dussell et al. | |
| 6,177,905 B1 | 1/2001 | Welch | |
| 6,266,612 B1 | 7/2001 | Dussell et al. | |
| 6,411,899 B2 | 6/2002 | Dussell et al. | |
| 6,484,033 B2 | 11/2002 | Murray | |
| 6,515,585 B2 | 2/2003 | Yamamoto | |
| 6,611,754 B2 | 8/2003 | Klein | |
| 6,680,675 B1 | 1/2004 | Suzuki | |
| 6,819,256 B2 * | 11/2004 | Hampton | 340/691.6 |
| 6,879,838 B2 | 4/2005 | Rankin et al. | |
| 6,943,671 B2 | 9/2005 | McGee et al. | |
| 6,944,539 B2 | 9/2005 | Yamada et al. | |
| 6,957,076 B2 | 10/2005 | Hunzinger | |

(Continued)

OTHER PUBLICATIONS

Bhawalkar, P., et al., "ScheduleNanny: Using GPS to Learn the User's Significant Locations, Travel Times and Schedule," [online] Sep. 2004 [retrieved on Apr. 21, 2006] Retrieved from the Internet: <URL: http://arxiv.org/ftp/cs/papers/0409/0409003.pdf> 8 pages.

*Primary Examiner* — Hung T. Nguyen

(57) ABSTRACT

An apparatus for providing a task reminder to be performed at a task location includes a monitoring module that monitors a location of a user via a mobile communication device associated with the user at predetermined time intervals for tracking historical travel information of the user, and a data store for storing the historical travel information and for storing user specified task information that includes a task and a task location. In an exemplary embodiment, the apparatus includes a reminder module that is configured to determine a reminder position as a position where an estimated probability of the user traveling from the reminder position at a particular time in a trajectory leading away from the task location exceeds an estimated probability of the user traveling from the reminder position at that same time in a trajectory leading toward the task location by a threshold value. The reminder module generates a reminder of the task when the reminder position is identified.

42 Claims, 10 Drawing Sheets

U.S. PATENT DOCUMENTS

| | | |
|---|---|---|
| 7,003,525 B1 | 2/2006 | Horvitz et al. |
| 7,084,758 B1 | 8/2006 | Cole |
| 7,155,456 B2 | 12/2006 | Abbott, III et al. |
| 7,395,507 B2 | 7/2008 | Robarts et al. |
| 7,512,889 B2 | 3/2009 | Newell et al. |
| 7,533,082 B2 | 5/2009 | Abbott et al. |
| 7,614,001 B2 | 11/2009 | Abbott et al. |
| 2002/0067308 A1 | 6/2002 | Robertson |
| 2002/0086680 A1 | 7/2002 | Hunzinger |
| 2002/0120351 A1 | 8/2002 | Tuomela et al. |
| 2003/0224762 A1 | 12/2003 | Lau et al. |
| 2003/0225589 A1 | 12/2003 | Eaton et al. |
| 2004/0176107 A1 | 9/2004 | Chadha |
| 2004/0192311 A1 | 9/2004 | Koskinen et al. |
| 2004/0203847 A1 | 10/2004 | Knauerhase et al. |
| 2004/0230685 A1 | 11/2004 | Seligmann |
| 2005/0009573 A1 | 1/2005 | Tokkonen |
| 2005/0102098 A1 | 5/2005 | Montealegre et al. |
| 2006/0077055 A1 | 4/2006 | Basir |
| 2006/0225076 A1 | 10/2006 | Longobardi |
| 2007/0159322 A1* | 7/2007 | Garratt Campbell .... 340/539.13 |
| 2008/0079566 A1 | 4/2008 | Singh et al. |
| 2008/0082651 A1 | 4/2008 | Singh et al. |

* cited by examiner

APPARATUS AND METHOD FOR PROVIDING A TASK REMINDER BASED ON TRAVEL HISTORY

CROSS-REFERENCE TO RELATED APPLICATIONS

The present application is a continuation of U.S. patent application Ser. No. 11/536,306, filed on Sep. 28, 2006 now U.S. Pat. No. 7,528,713, entitled "APPARATUS AND METHOD FOR PROVIDING A TASK REMINDER BASED ON TRAVEL HISTORY", which is related to U.S. patent application Ser. No. 11/536,232, filed on Sep. 28, 2006 now U.S. Pat. No. 7,649,454, entitled "METHOD AND SYSTEM FOR PROVIDING A TASK REMINDER", filed concurrently with U.S. patent application Ser. No. 11/536,306 and commonly owned and herein incorporated by reference.

BACKGROUND

Handheld electronic devices, such as personal digital assistants (PDAs), mobile phones, digital cameras, and the like, offer mobility and a variety of services to their respective users. While they are typically configured to transmit and receive data to and from other devices via a wired or wireless connection, most mobile communication devices can also provide Internet access, maintain a personal address book, provide messaging capabilities, capture digital images, and place phone calls. Many devices, in particular smart phones and PDAs, provide a calendaring and/or "to-do list" function that allows the user to calendar appointments and to enter tasks directly into the device or into a service in a remote server. The calendaring function can be configured to provide a reminder of an appointment or task to the user at or near the time the appointment has been scheduled.

Many mobile communication devices can also identify their respective locations within a certain range depending on the device and location identifying technique. Some devices can use a sophisticated position determining system, such as a Global Positioning System (GPS). The GPS is a satellite-based radio navigation system that uses signals from three or four satellites to compute the current latitude, longitude and elevation of a GPS receiver in the device anywhere on earth down to within a few meters. Other devices can use a location identifying technique based on which base station is servicing the device, that is, the location of the device is within a range of the base station from which a call is made. Other devices can use location identifying techniques based on triangulation between the device and at least two base stations.

The device's location, typically represented by geospatial coordinates, can be used in a variety of ways. For example, a mapping service can use the device's current location to provide street directions from the current location to a desired destination location. In addition, a street address or name corresponding to the geospatial coordinates can be associated with a task or an appointment that is scheduled to be performed at or near the location. For example, the user can associate a task on the to-do list, e.g., "pick up medicine," with the street address or geospatial coordinates associated with a task location, e.g., the user's pharmacy. When the device detects that the user is within a certain distance of the task location, e.g., the pharmacy, the device can display a message reminding the user to perform the task, e.g., "pick up medicine." Alternatively, a reminder can be issued when the device detects that the user is near the task location and is traveling in a trajectory leading to the task location.

Location-based task reminders are useful for prompting the user to perform tasks that are located nearby. Typically, the reminders are generated when the user comes within a predetermined fixed distance of the task location and or when the user is traveling in a trajectory leading to the task location within the predetermined distance. This can be problematic, however, when the user does not routinely travel within the predetermined distance of task location. For example, if the user routinely travels a particular route and the task location is not located within the predetermined distance of the route, the user may never receive a task reminder unless he breaks away from the familiar route and travels within the predetermined distance of the task location. As a result, the user might forget to perform the task or miss an appointment.

To address this problem, some services allow the user to enter a reminder distance when the user calendars the task and task location. This approach, however, may not be helpful if the user is unfamiliar with the task location, or if another person other than the user is calendaring the task for the user. In any event, requiring the user to provide information in addition to the task/appointment and task location can be time-consuming and inconvenient.

SUMMARY

Accordingly, an apparatus and method for providing a task reminder to be performed at a task location are described. According to one exemplary embodiment, the apparatus includes a monitoring module that monitors a location of a user via a mobile communication device associated with the user at predetermined time intervals for tracking historical travel information of the user, and a data store for storing the historical travel information and for storing user specified task information that includes a task and a task location. In an exemplary embodiment, the apparatus includes a reminder module that is configured to determine a reminder position as a position where an estimated probability of the user traveling from the reminder position at a particular time in a trajectory leading away from the task location exceeds an estimated probability of the user traveling from the reminder position at that same time in a trajectory leading toward the task location by a threshold value. The reminder module generates a reminder of the task when the reminder position is identified.

According to another exemplary embodiment, a method of providing a task reminder to be performed at a task location includes tracking historical travel information of a user of a mobile communication device by monitoring a location of the user via the mobile communication device at predetermined time intervals, receiving user specified task information that includes a task and a task location, and storing the user's historical travel information and user specified task information in a data store. The method further includes determining a reminder position as a position where an estimated probability of the user traveling from the reminder position at a particular time in a trajectory leading away from the task location exceeds an estimated probability of the user traveling from the reminder position at that same time in a trajectory leading toward the task location by a threshold value, and generating a reminder of the task when the reminder position is identified.

BRIEF DESCRIPTION OF THE DRAWINGS

The accompanying drawings provide visual representations which will be used to more fully describe the representative embodiments disclosed here and can be used by those skilled in the art to better understand the representative embodiments and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

According to an exemplary embodiment, intelligent, situation-sensitive task reminders are generated for a user of a mobile communication device. In one embodiment, a task reminder for a task is generated before the user arrives at a position where the user would tend to veer away from a task location associated with the task. By providing the task reminder before the user arrives at that position, the user can choose to deviate from the routine route (which leads away from the task location) and travel in a trajectory that leads toward the task location.

In one embodiment, the historical travel information of the user in relation to a position is analyzed to determine whether a task reminder should be generated. According to an exemplary embodiment, the historical travel information is used to calculate the respective probabilities of the user traveling from the position in a trajectory leading away from and toward the task location. When the probability of traveling away from the task location exceeds the probability of traveling toward the task location by a threshold value, a task reminder can be generated. In one embodiment, the task reminder is generated when the position is within a predetermined distance of the user's current position.

Figure 1:
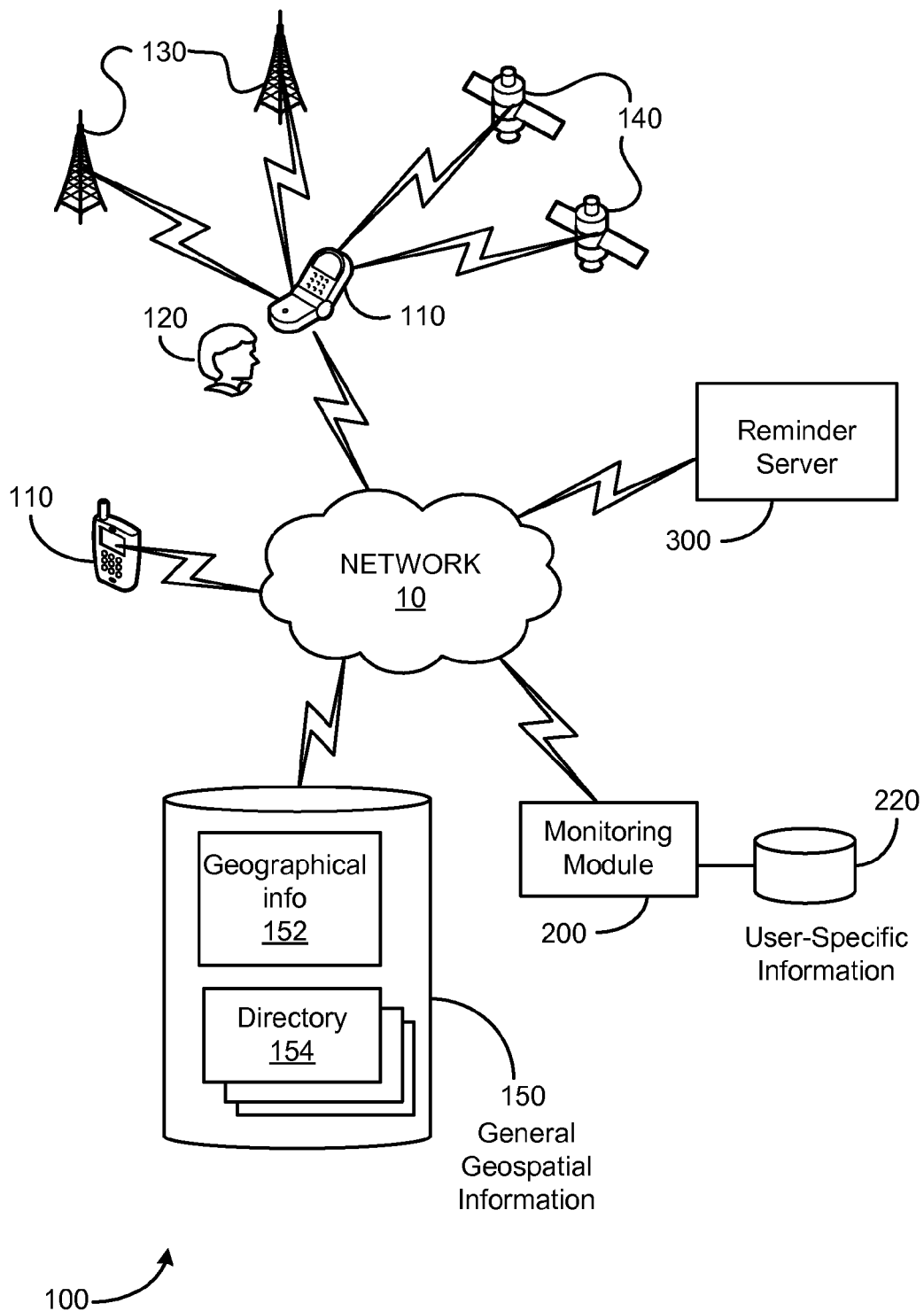
FIG. 1 is a block diagram illustrating an exemplary task reminder system according to an exemplary embodiment.

FIG. 1 is a block diagram illustrating an exemplary arrangement for a task reminder system 100 according to one embodiment. One or more network-enabled mobile communication devices 110, such as a digital camera/phone, PDA, laptop or the like, are in communication with a reminder server 300 over a network 10. A data store 150 includes general geospatial information relating to a plurality of locations and is accessed by the device 110 or the reminder server 300 over the network 10. The general geospatial information 150 is typically public information that can include geographical information 152 that maps geospatial coordinates to street names and building names. The geospatial information 150 can also include one or more directories 154 that provide other information associated with street addresses. Well known mapping services (not shown) can use the geospatial information 150 to generate traveling routes between two locations, and to determine a distance between two locations.

According to an exemplary embodiment, the system 100 includes means for monitoring a location of a user 120 via a mobile communication device 110 associated with the user 120 at predetermined time intervals, such as a monitoring module 200 that is in communication with the devices 110 and with the reminder server 300 over the network 10. In an exemplary embodiment, the monitoring module 200 monitors the location of the user 120 in order to track the historical travel information of the user 120.

The system further includes means for receiving user specified task information, which includes a task and a task location, and means for storing user-specific information that includes the historical travel information of the user 120 and the user specified task information. For example, in an exemplary embodiment, the monitoring module 200 is configured to store and manage the user-specific information in a data store 220.

Figure 2:
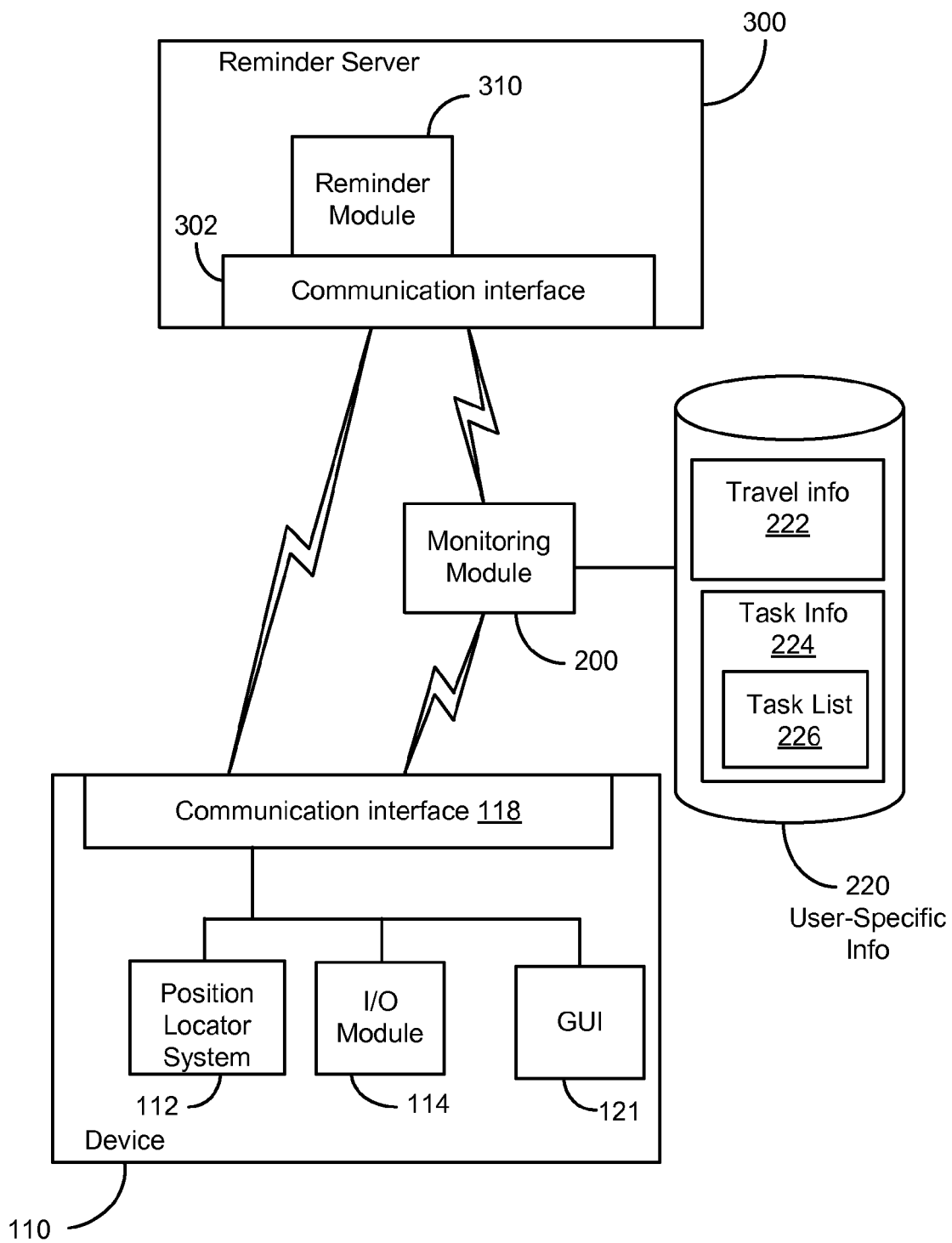
FIGS. 2-4 are more detailed block diagrams illustrating the task reminder system according to several exemplary embodiments.

FIG. 2 is a more detailed block diagram of the reminder system 100 according to an exemplary embodiment. Each device 110 includes circuitry that can track a position of the device 110. For example, the device 110 can include a position locator system 112 that tracks the position of the device 110. The position locator system 112 can be the well known global positioning system (GPS) that utilizes satellites 140 (FIG. 1) to determine the device's longitudinal and latitudinal position. Alternatively, the position locator system 112 can be configured to utilize one or more base stations 130 within communication range to determine the device's location. Each mobile communication device 110 also includes circuitry for communicating with the reminder server 300 and monitoring module 200. For example, the device 110 can include a communication interface 118 coupled to a user interface 121 and input/output (I/O) module 114 that allows the user 120 to use the device 110 to communicate with the server 300 over a wireless network 10 using one or more communication protocols.

The monitoring module 200 can be a personal computer or other device capable of collecting, storing and managing data. The monitoring module 200 can include a communication interface (not shown) to receive and transmit data over the network 10. In one embodiment, the monitoring module 200 monitors the location of the device 110 at predetermined time intervals in order to track the user's historical travel information 222. The historical travel information 222 can include the number of times the user 120 is present at or near a location, the amount of time the user 120 is present at or near the location, the number of times the user 120 has changed his or her position between at least two locations, and/or the number of times the user 120 has entered or exited a region. The historical travel information 222 is stored in the data store 220 along with the task information 224.

The reminder server 300 can be a personal computer or other device capable of processing data. The reminder server 300 includes a communication interface 302 to transmit and receive data over the network 10. In one embodiment, the reminder server 300 is configured to retrieve user-specific information from the data store 220 over the network 10 via the monitoring module 200.

The system 100 further includes means for generating a reminder of a task based on the user's historical travel information. For example, according to an exemplary embodiment, the reminder server 300 includes a reminder module 310 which is communicatively coupled to the communication interface 302. The reminder module 310 is configured to determine whether it would be useful to generate a task reminder for the user 120 based on the user's current position and the user's historical travel patterns in a region including the user's current position and the task location.

In one embodiment, a task reminder is generated when the reminder module 310 identifies a reminder position near the user's current position. In an exemplary embodiment, a reminder position is a position where an estimated probability of the user 120 traveling from the reminder position at a particular time in a trajectory leading away from the task location exceeds an estimated probability of the user 120 traveling from the reminder position at that same time in a trajectory leading toward the task location by a threshold value. When the reminder module 310 identifies a position that satisfies the criteria for a reminder position, the task reminder is generated and transmitted to the user 120.

Figure 3:
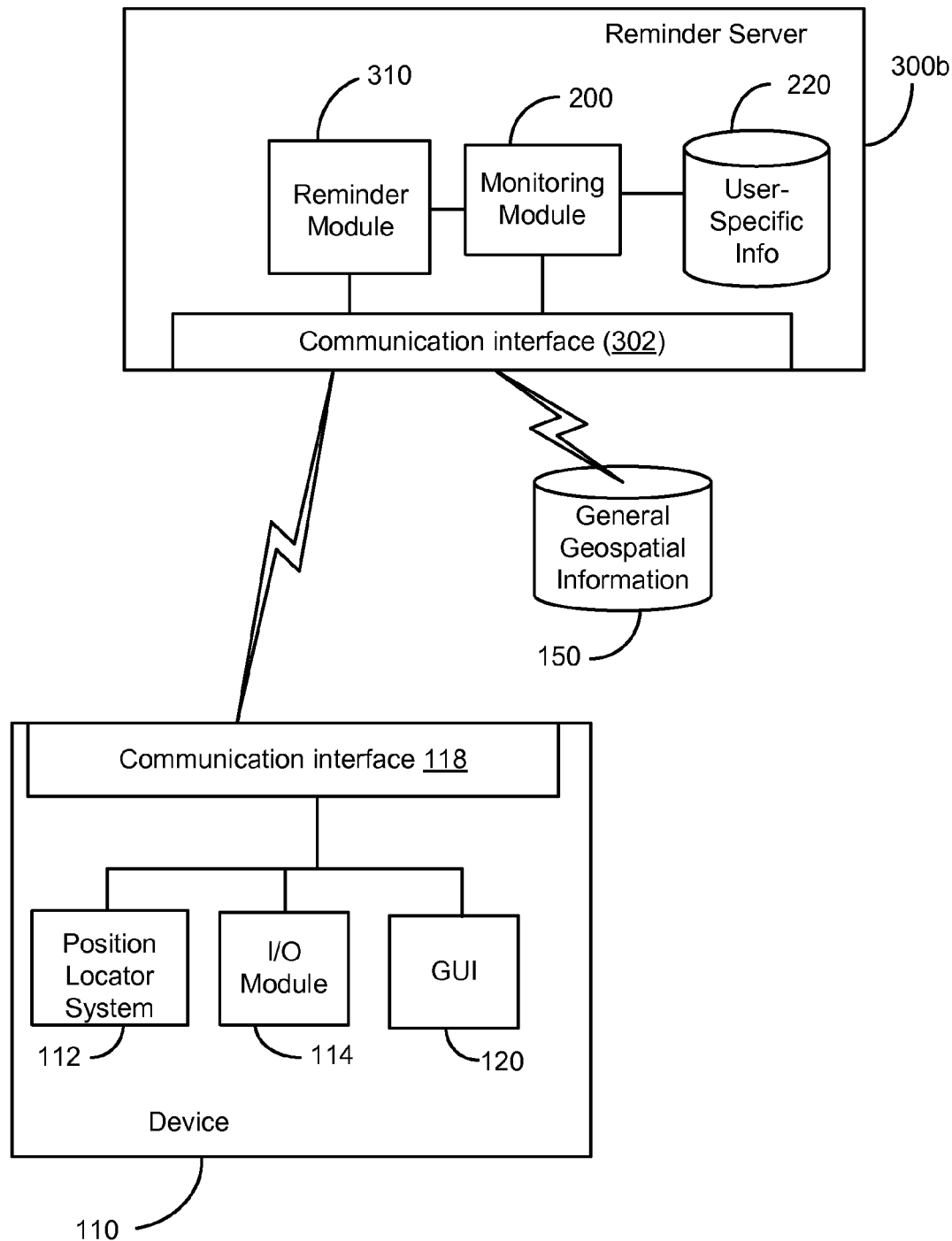

The system 100 illustrated in FIG. 1 and FIG. 2 is but one exemplary arrangement. In this arrangement, a "thin" mobile communication device 110 can be accommodated because the historical travel information 222 and task information 224 can be stored remotely and the functionality of the monitoring module 200 and the reminder module 310 can be included in separate servers. Other arrangements can be designed by those skilled in the art. For example, in one embodiment shown in FIG. 3, the functionality of the monitoring module 200 and the data store 220 can be included in the reminder server 300b so that the reminder server 300b securely manages the user-specific information 220.

Figure 4:
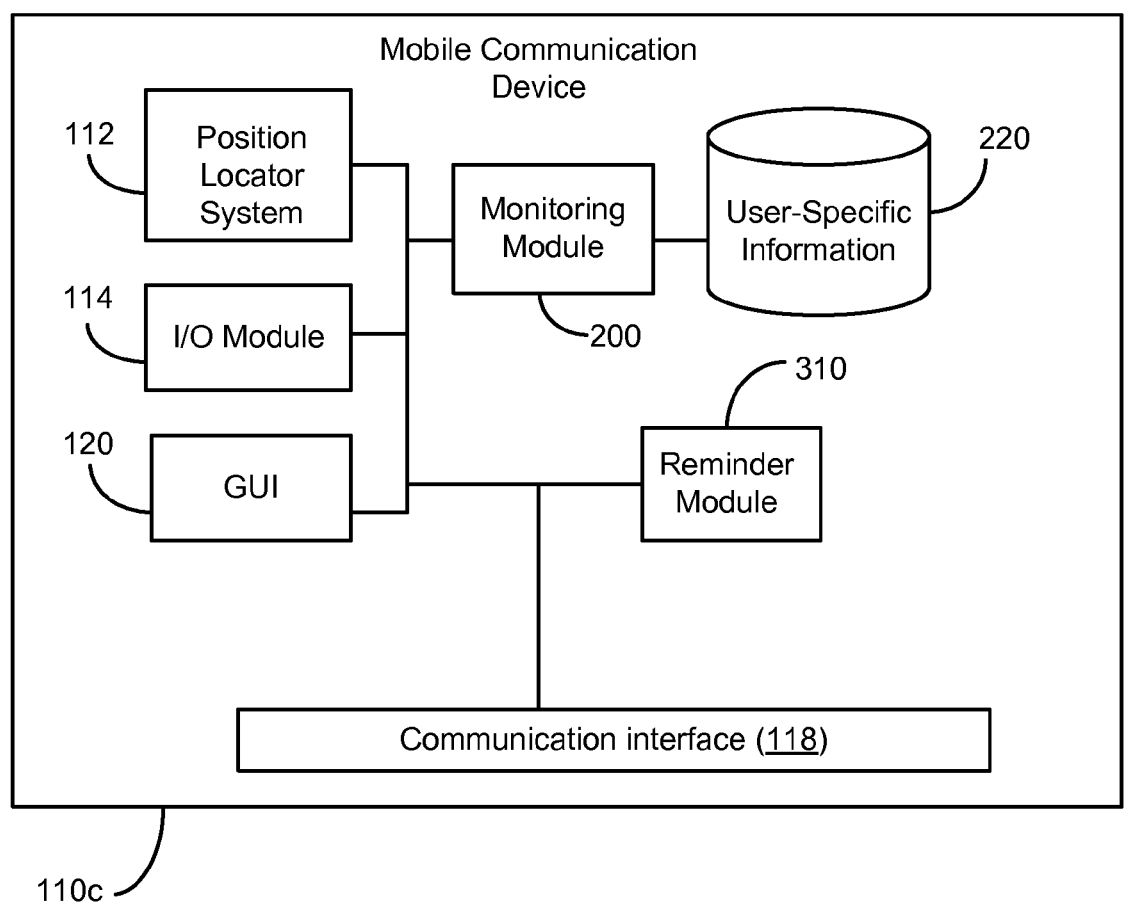

In another embodiment, shown in FIG. 4, the mobile communication device 110c can perform the functions of the reminder module 310 and the monitoring module 200, and store the user-specific information 220 internally in the device memory (not shown). In this arrangement, the reminder server 300 is not required. Variations of these embodiments may be utilized and structural and functional modifications may be made without departing from the scope of the present disclosure. For example, the functionality of the monitoring module 200 can be integrated with that of the mobile communication device 110 and can be configured to transmit the historical travel information 222 to the reminder module 310, which stores and manages the information in the data store 220. In this example, the reminder module 310 can also be configured to receive and store the task information 224 directly from the mobile communication device 110, and can manage the information in the data store 220.

Figure 5:
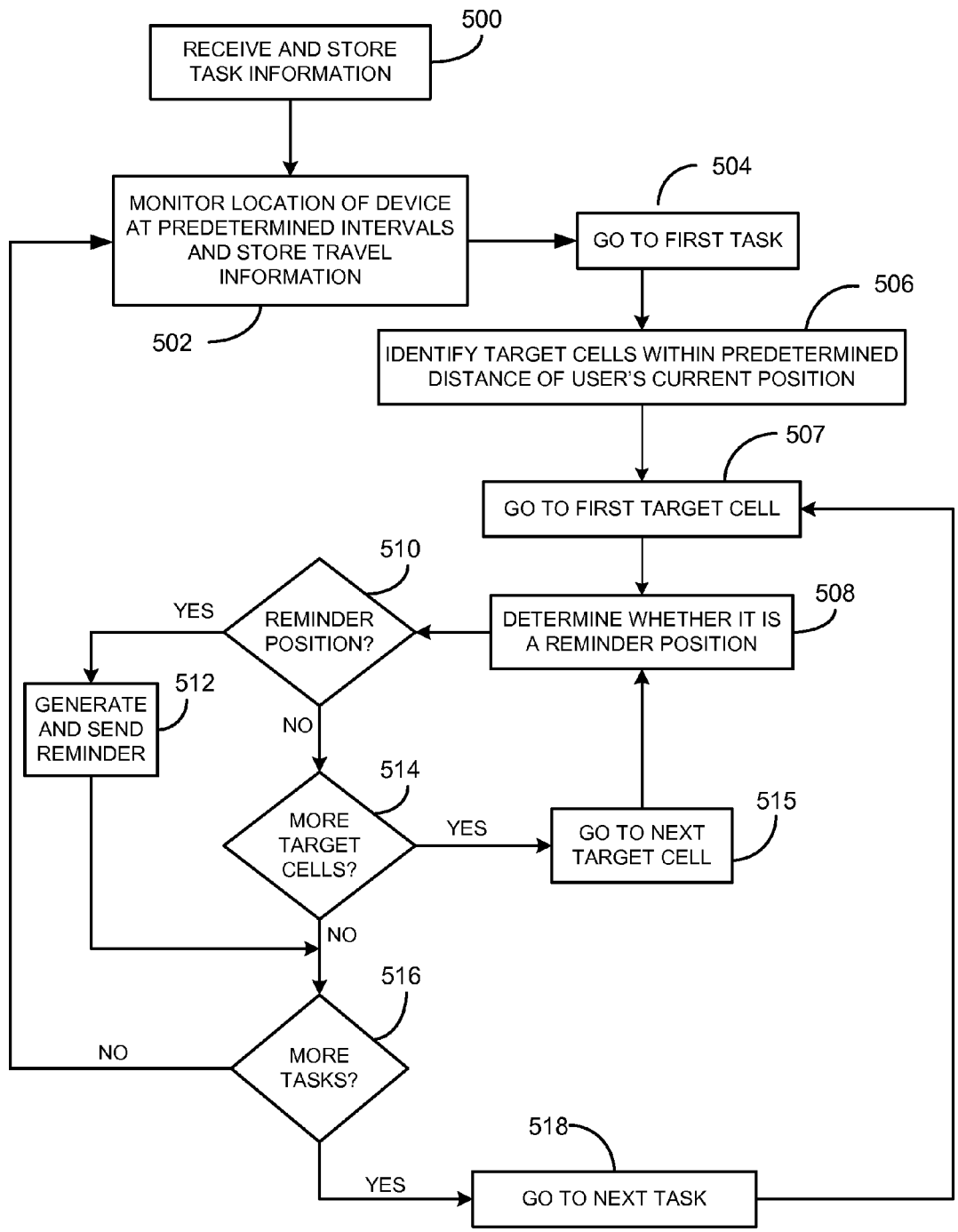
FIG. 5 is a flow diagram illustrating an exemplary process for providing a task reminder according to an exemplary embodiment.

FIG. 5 is a flow diagram illustrating an exemplary process for providing a task reminder according to one embodiment. Referring to FIGS. 1-4, the exemplary process begins when user-specified task information 224 is received and stored in the data store 220 (step 500). In one embodiment, the task information 224 includes a description that describes the task and at least one task location that indicates where the task can be performed. For example, if the task is to "buy organic apples," the task information can identify several organic grocery stores where the user 120 can perform the task. In addition, the task information 224 can indicate a priority level, a time frame in which the task should be completed, with whom the task should be performed, and any other information related to the task, e.g., prescription number, phone number to call, etc. A task location can be represented by any one of the geospatial coordinates of the task location, a street address, and a location name.

In one embodiment, the user 120 specifies the task information 224 using a network enabled device, such as the mobile communication device 110, and sends the task information 224 to the reminder module 310 in the reminder server 300 or to the monitoring module 200 over the network 10 via the communication interface 118. The task information 224 is then organized in a task list 226. In one embodiment, the task list 226 includes at least one task and a reference to the associated task information. The tasks can be sorted in the order in which they were received, by priority/importance, by time frame, or by any other suitable factor.

Referring again to FIG. 5, in addition to receiving and storing the task information 224, the location of the mobile communication device 110 is monitored at predetermined time intervals and the historical travel information is stored in the data store 220 (step 502). In one embodiment, an entire geographical area of interest is represented by a plurality of contiguous cells, where different cells do not overlap. The user's position can be identified by geospatial coordinates generated by the position locator system 112 in the device 110 or provided by the user 120 via the I/O module 114. The geospatial coordinates of the user/device 110 can be used to identify the cell in which the user's position is located so that the historical travel information of the user 120 can be tracked.

In one embodiment, the monitoring module 200 monitors the device's location and collects the historical travel information 222 of the user by querying the position locator system 112 in the device 110 at a fixed time interval or sampling interval. For example, the monitoring module 200 can collect the travel information 222 every two minutes. In another embodiment, the monitoring module 200 can collect the information 222 at a sampling interval proportional to a velocity or expected velocity of the mobile communication device 110. For example, if the mobile communication device 110 is installed in a car, the sampling interval can be based on the average velocity of the car.

For each of the plurality of cells, the monitoring module 200 collects transition information associated with a cell. In one embodiment, the transition information includes a number of times the user 120 moves from the cell to any other cell, or remains within the same cell, during consecutive sampling intervals. For example, consider an exemplary region that is represented by a plurality of contiguous, non-overlapping cells 600 illustrated in FIG. 6. As is shown, the monitoring module 200 keeps track of the transition information associated with the center cell 600a over a plurality of sampling intervals. According to this example, the transition information indicates that the user 120 has moved from the center cell 600a to the westward adjacent cell (600W) 13 times, to the eastward adjacent cell (600E) 2 times, to the northward adjacent cell (600N) 7 times, and to the southward adjacent cell (600S) 1 time. In addition, the user 120 has stayed in the same cell 44 times. This transition information, referred to above as the historical travel information 222 of the user 120, is stored in the data store 220.

According to an exemplary embodiment, after the historical travel information 222 is stored, the reminder module 310 considers a first task on the task list 226 (block 504). A target cell evaluator module 312 in the reminder module 310, shown in FIG. 7, identifies a plurality of target cells within a predetermined distance of the user's current position (block 506). In one embodiment, the predetermined distance, D, can be proportional to a length, L, of a side of the cell 600, e.g., D=3L, or proportional to the velocity or expected velocity of the mobile communication device 110. The predetermined distance should be large enough to allow the user 120 sufficient time to choose a trajectory toward the task location, but small enough to provide a reminder that is timely and meaningful.

Figure 8A:
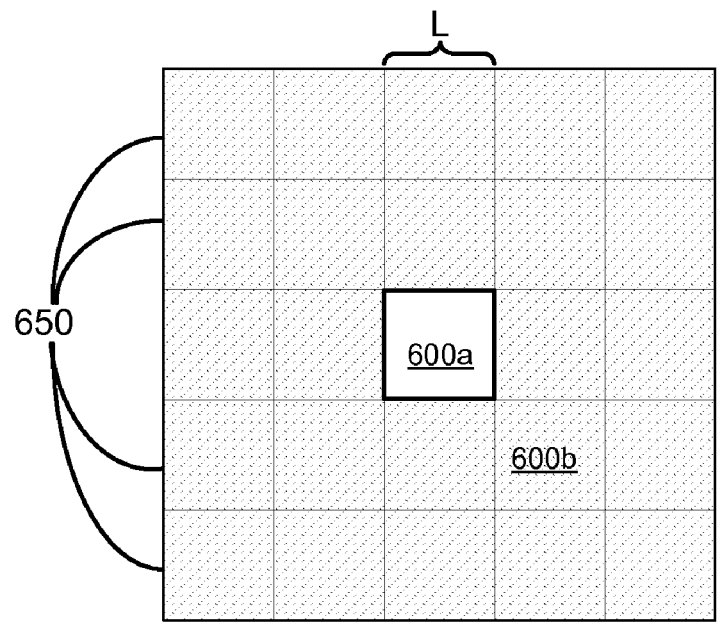
FIG. 8A and FIG. 8B are block diagrams illustrating exemplary target cells according to exemplary embodiments.

In FIG. 8A, the cross-hatched cells are exemplary target cells 650 when the user's current position is located in the center cell 600a and the predetermined distance, D, is equal to 2L. In another embodiment, a cell 600b can be identified as a target cell 650 when it is within a predetermined distance of the user's current position and when a probability of the user 120 traveling from the current position to the cell 600b exceeds a minimum probability threshold value. In one embodiment, the target cell evaluator 312 uses the transition information associated with the cell 600a in which the user's current position lies, e.g., the center cell 600a, to calculate the probability of the user 120 traveling from the current position to the cell 600b.

Figure 8B:
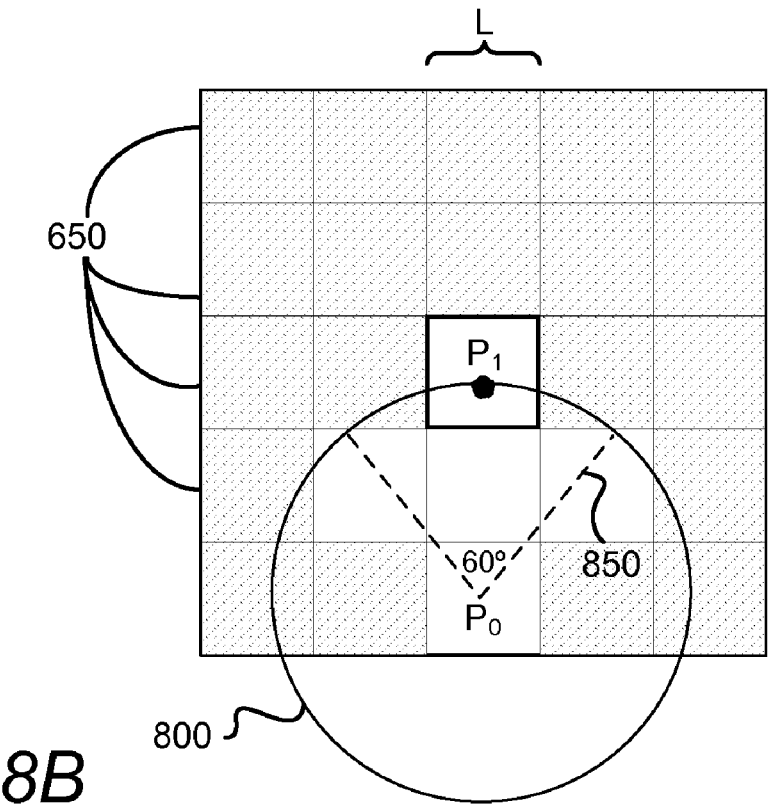

In another embodiment, the target cell evaluator module 312 further identifies the plurality of target cells 650 based on a current travel pattern of the user 120. In this embodiment, the target cell evaluator module 312 considers a previous position of the user 120, $P_0$, and the current position of the user 120, $P_1$, in determining which cells 600 are identified as target cells 650. In an exemplary embodiment, illustrated in FIG. 8B, a circle 800 is defined having a center at or near the previous position, $P_0$, and having a radius substantially equal to the distance between the previous position, $P_0$, and the current position, $P_1$. As is shown, the current position, $P_1$, lies on the circle's 800 diameter and bisects a segment that defines a sector 850 of the circle 800. In one embodiment, the sector 850 has a central angle of approximately 60 degrees. The target cells 650 are those cells that are within a predetermined distance of the user's current position and that are not substantially within the sector 850.

Referring again to FIG. 5, once the target cells 650 are identified, the target cell evaluator module 312 considers a first target cell 650 (block 507) and determines whether the target cell 650 is a reminder position (block 508). As stated above, a target cell 650 is a reminder position when an estimated probability of the user 120 traveling from the target cell 650 at a particular time in a trajectory leading away from the task location exceeds an estimated probability of the user 120 traveling from the target cell 650 at that same time in a trajectory leading toward the task location by a threshold value.

Figure 9:
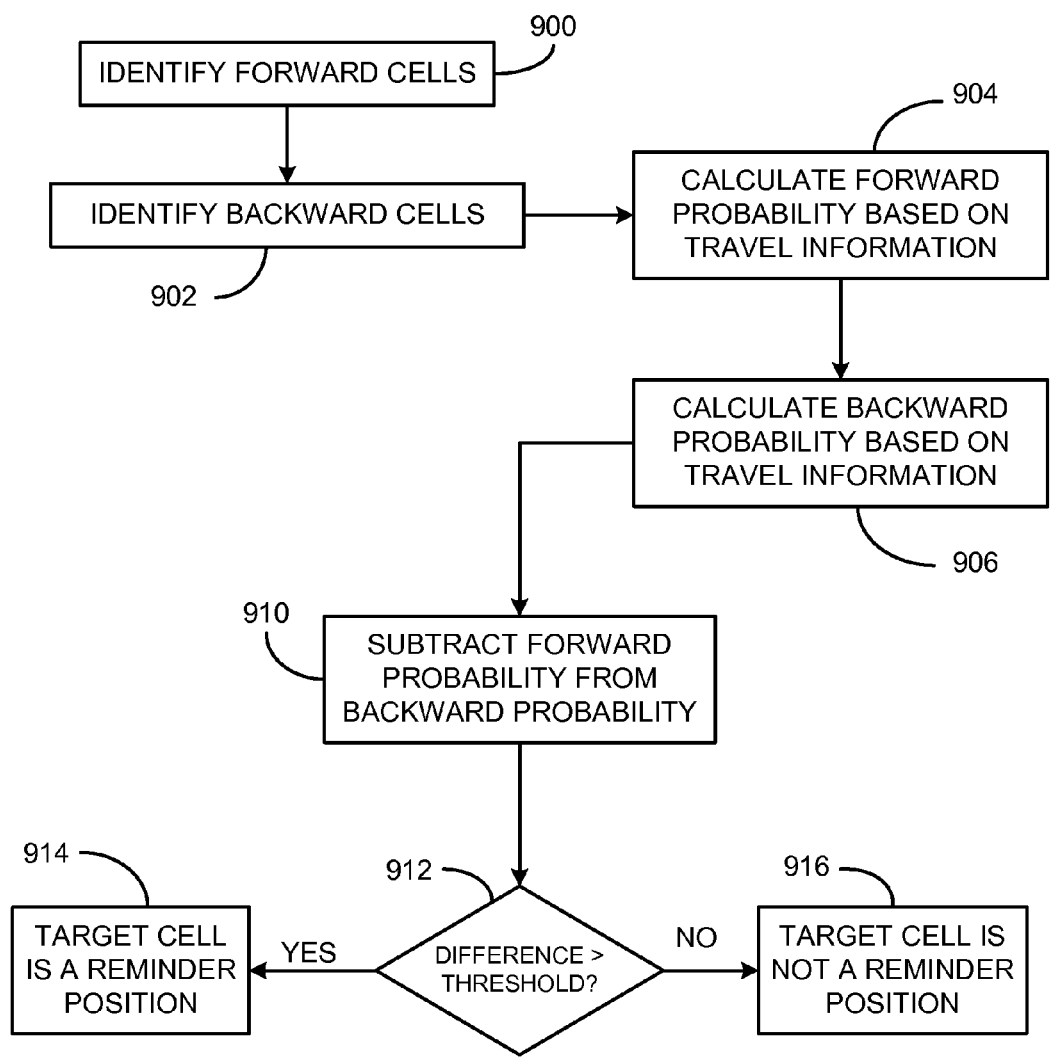
FIG. 9 is a flow diagram illustrating an exemplary process for determining whether a target cell is a reminder position according to one embodiment.

FIG. 9 is a flowchart illustrating an exemplary process for determining whether a target cell 650 is a reminder position according to one embodiment. The process begins when the target cell evaluator module 312 identifies one or more forward cells that are cells that fall within a trajectory leading toward the task location (block 900). In an exemplary embodiment, the task location is locate in a task cell and each of the plurality of cells 600, including the target cell 650 and the task cell, can be identified by Cartesian coordinates, (x, y), and the target cell 650 can be located at an origin, (0, 0).

Figure 10A:
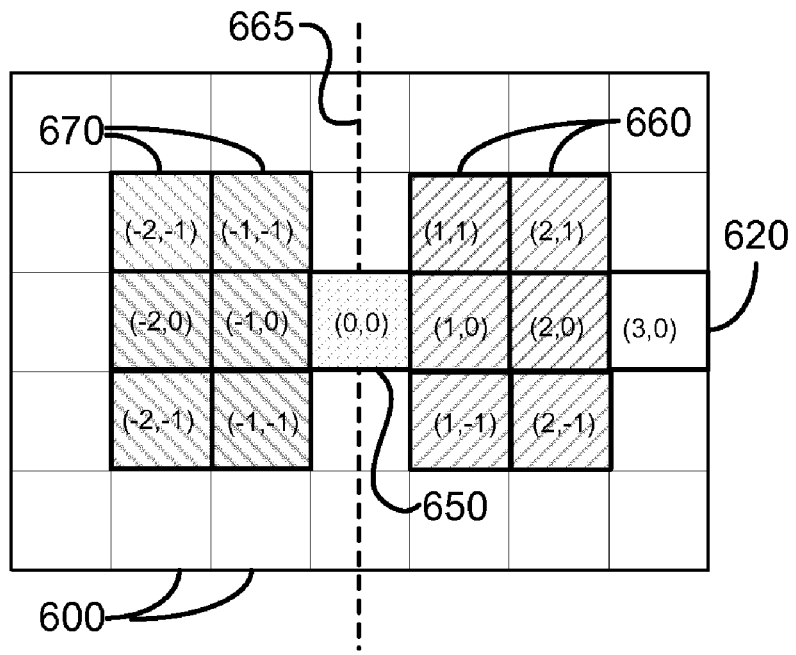
FIG. 10A and FIG. 10B are block diagrams illustrating exemplary forward and backward cells according to exemplary embodiments.

In one embodiment, illustrated in FIG. 10A, the task cell 620 and the target cell 650 can be aligned horizontally, as shown, or vertically (not shown). In this configuration, the forward cells 660 (depicted with forward slashing) can include the cells that fall on the horizontal (or vertical) line from the target cell 650 to the task cell 620 and/or the cells that lie immediately adjacent to the horizontal (or vertical) line. For example, in FIG. 10A, the task cell 620 has coordinates (3, 0). Accordingly, the forward cells 660 can include the cells having the coordinates: (1, 0), (2, 0), (1, 1), (2, 1), (1, −1), and (2, −1).

Figure 10B:
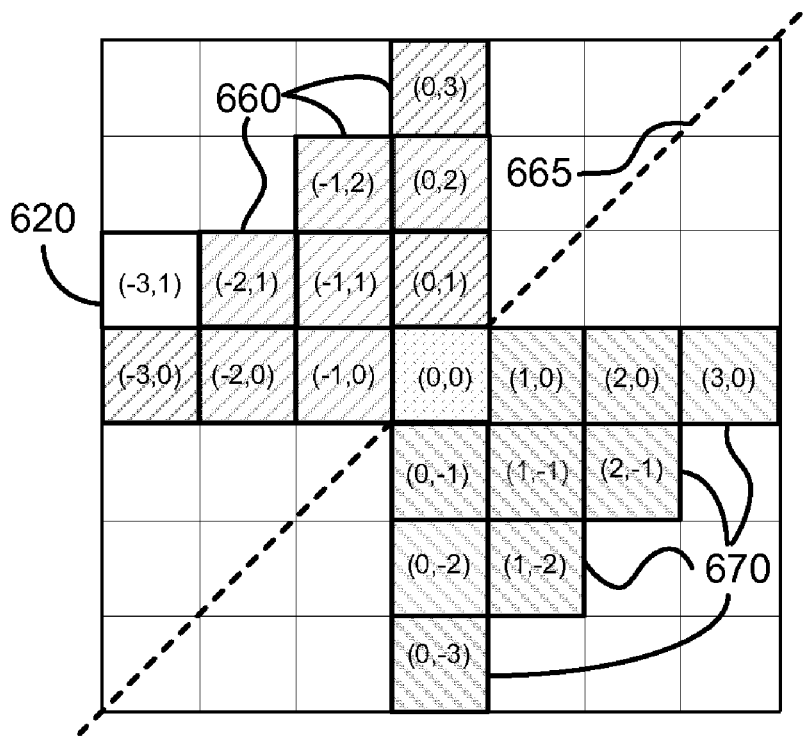

In another embodiment, illustrated in FIG. 10B, the task cell 620 and the target cell 650 can be skewed, i.e., not aligned horizontally or vertically. In this configuration, the forward cells 660 can be:

cells where a sum of absolute values of the cell coordinates is greater than zero and less than a sum of absolute values of the task coordinates and whose cell coordinates have the same polarity as the task coordinates; and/or cells where the x coordinate is at least equal to zero and at most equal to the x coordinate of the task cell and the y coordinate is at least equal to zero and at most equal to the y coordinate of the task cell when the x and y coordinates of the task cell are each at least equal to zero; and/or cells where the x coordinate is at least equal to zero and at most equal to the task cell's x coordinate and the y coordinate is at least equal to the task cell's y coordinate and at most equal to zero when the task cell's x coordinate is at least equal to zero and the task cell's y coordinate is less than zero; and/or cells where the x coordinate is at least equal to the task cell's x coordinate and at most equal to zero and the y coordinate is at least equal to the task cell's y coordinate and at most equal to zero when the task cell's x and y coordinates are less than zero.

For example, in FIG. 10B, the task cell 620 has coordinates (−3, 1). Accordingly, the forward cells 660 can include the cells having the coordinates: (−3, 0), (−2, 1), (−2, 0), (−1,2), (−1, 1), (−1, 0), (0, 3), (0, 2), and (0, 1).

Referring again to FIG. 9, once the forward cells 660 have been identified, the target cell evaluator module 312 can identify one or more backward cells that are cells that fall within a trajectory leading away the task location (block 902). In an exemplary embodiment, the backward cells can be identified as reflections of the forward cells 660. As used herein, a first cell is a reflection of a second cell when the coordinates of the first cell are a mirror reflection of the coordinates of the second cell. That is, the respective absolute values of the x and y coordinates of the first and second cells are the same, but have opposite polarities. For example, when the first cell's coordinates are (x, y), the reflection cell's coordinates are (−x, −y).

For example, referring again to FIG. 10A, the backward cells 670 (depicted with backward slashing) are reflections of the forward cells 660 along a vertical mirror plane 665 passing through the origin. Accordingly, the backward cells 670 can include the cells having the coordinates: (−1, 0), (−2, 0), (−1, −1), (−2, −1), (−1, 1), and (−2, 1). Similarly, referring again to FIG. 10B, the backward cells 670 are reflections of the forward cells 660 along the mirror plane 665. Accordingly, the backward cells 670 can include the cells having the coordinates: (3, 0), (2, −1), (2, 0), (1, −2), (1, −1), (1, 0), (0, −3), (0, −2), and (0, −1).

Referring again to FIG. 9, once the forward 660 and backward 670 cells have been identified, the target cell evaluator module 312 calculates a forward probability of the user 120 traveling from the target cell 650 in a trajectory leading toward the task position based on the historical travel information 222 of the user 120 (block 904). In an exemplary embodiment, the target cell evaluator module 312 retrieves the historical travel information 222 of the user 120 from the data store 220 and uses the travel information 222 to calculate the forward probability. In one embodiment, the information 222 can be retrieved via the monitoring module 200. In another embodiment, a data manager 313 in the reminder module 310, shown in FIG. 7, can retrieve the information 222 directly from the data store 220.

In an exemplary embodiment, the transition information associated with the target cell 650 is used to calculate the forward probability. As stated above, the transition information for a cell includes the number of times the user 120 moves from the cell to any other cell, including the same cell, during consecutive sampling intervals. In one embodiment, the forward probability can be the sum of the number of times the user 120 has traveled from the target cell 650 to any of the forward cells 660 divided by a total number of transitions from the target cell 650.

Figure 6:
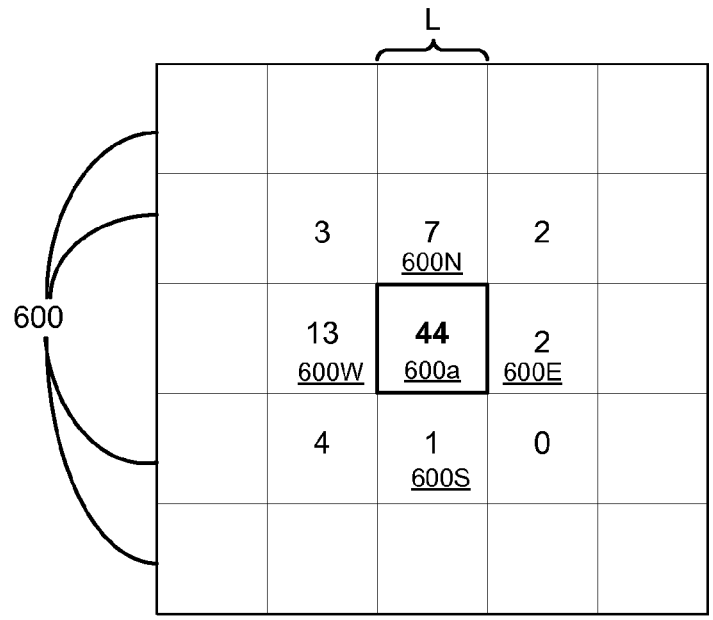
FIG. 6 is a block diagram illustrating an exemplary region comprising a plurality of contiguous non-overlapping cells according to an exemplary embodiment.

For example, let the transition information illustrated in FIG. 6 be associated with the target cell 650 illustrated in FIG. 10A, i.e., the center cell 600a in FIG. 6 is the target cell 650 in FIG. 10A. In this example, where the task cell 620 has coordinates (3, 0), the sum of the number of times the user 120 has traveled from the target cell 650 to any of the forward cells 660 is four (4), and the total number of transitions from the target cell 650 is 76. Accordingly, the forward probability of the target cell 650 is 4/76.

In the embodiment described above, the forward probability is calculated from the transition information that reflects the number of times the user 120 moves from the target cell 650 directly to any of the forward cells. In other words, the forward probability reflects the probability of the user 120 moving from the target cell 650 to any of the forward cells 660 in one sampling interval or step. In another embodiment, the forward probability can be based on the number of times the user 120 travels from the target cell 650 to any of the forward cells 660 via one or more cells 600. In other words, the forward probability can reflect the probability of the user 120 arriving at a forward cell 660 in two or more steps.

In this embodiment, transition probabilities between cells 600 can be represented in a transition-probability matrix, M, where the rows of the matrix are "from" cells and the columns of the matrix are "to" cells, and the elements of the transition-probability matrix are the transition probabilities. That is, element $M[u, v]$ is the probability of transitioning from cell "u" to cell "v" in one step.

Let N be a number of steps and let the task cell 620 have coordinates (X, Y), then:

$$N=|X|+|Y|; \text{ or}$$

$$N=\text{minimum } (|X|,|Y|).$$

In this embodiment, the probability of traveling from cell u to cell v in N steps can be derived by multiplying the transition-probability matrix, M, with itself N times. The resulting N-step transition probability matrix, $M^N$, includes the probabilities of moving from cell u to cell v in exactly N steps. In another embodiment, the probability of traveling from cell u to cell v in up to N steps can be derived by the following:

$$M^{UP\ TO\ N}=M+M^2+M^3+\ldots+M^N.$$

In this embodiment, the forward probability can reflect a more accurate estimate of the user's 120 travel tendencies because a horizon greater than a single step is considered. Such probabilities would capture the probabilities of the user 120 arriving at a forward cell 660, even when the user 120 passes through a backward cell 670 or non-backward or forward cell 600, respectively, to get to the forward cell 660.

Referring again to FIG. 9, once the forward probability is calculated (block 904), the target cell evaluator module 312 calculates a backward probability of the user 120 traveling from the target cell 650 in a trajectory leading away from the task position based on the historical travel information of the user 120 (block 906). In an exemplary embodiment, the backward probability is calculated in the same manner described for calculating the forward probability. That is, the backward probability can be the sum of the number of times the user 120 has traveled from the target cell 650 to any of the backward cells 670 divided by a total number of transitions from the target cell 650. For example, referring again to the transition information shown in FIG. 6, the sum of the number of times the user 120 has traveled from the target cell 650 to any of the backward cells 670 is 20, and the total number of transitions from the target cell 650 is 76. Accordingly, the backward probability of the target cell 650 is 20/76. Alternatively, in another embodiment, the backward probability can be based on the number of times the user 120 travels from the target cell 650 to any of the backward cells 670 via one or more cells 600.

In an exemplary embodiment, the target cell evaluator 312 then subtracts the forward probability from the backward probability (block 910) and compares the difference to the threshold value (block 912). If the difference is greater than the threshold value, the target cell evaluator module 312 designates the target cell 650 as a reminder position (block 914). Conversely, if the difference is less than the threshold value, the target cell 650 is not so designated (block 916).

Referring again to FIG. 5, when the target cell evaluator module 312 determines that the target cell 650 is not a reminder position (block 510), the reminder module 310 determines whether more target cells need to be analyzed (block 514) and if such is the case, goes to the next target cell 650 (block 515) and repeats the process described in blocks 508 and 510.

Figure 7:
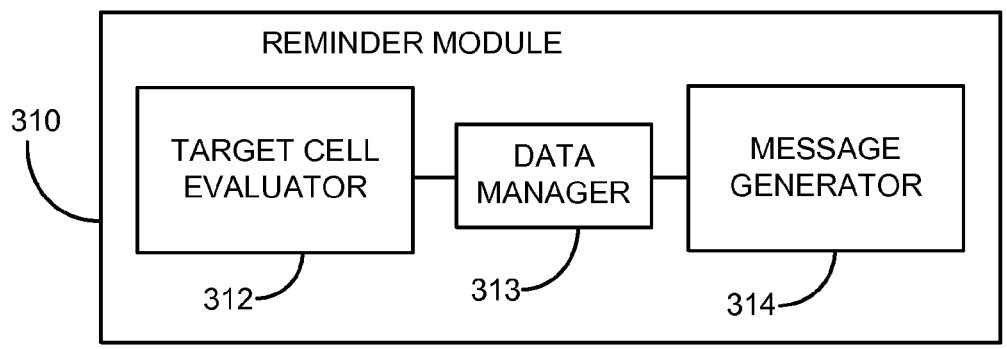
FIG. 7 is a block diagram illustrating an exemplary reminder module according to an exemplary embodiment.

When the target cell evaluator module 312 determines that the target cell 650 is a reminder position (block 510), the reminder module 310 can call a message generator module 314, shown in FIG. 7, which is configured to generate and send the task reminder to the user 120 via the mobile communication device (block 512). In one embodiment, the message generator module 314 can first determine whether the user 120 is available to receive the reminder. In one embodiment, the user 120 is available when she is actively using the mobile communication device 110 or has recently used the device 110 within a specified time period, e.g., 10 seconds. In one embodiment, the message generator module 314 can call the monitoring module 200 to make this determination.

If the user 120 is using or has recently used the device 110, e.g., by taking pictures or sending messages to others, the message generator module 314 can send a message that includes the task reminder to the user 120 during use or immediately after the user 120 has stopped actively using the device 110. Otherwise, the message generator module 314 can wait until the user 120 is available. In one embodiment, when the task reminder for a task has been sent, the message generator module 314 is configured to prevent a subsequent task reminder for the same task to be sent unless a predetermined time period has expired and/or a distance between the user 120 and the task cell 620 has not reduced to zero, but has exceed a threshold distance that is greater than the predetermined distance.

After the task reminder has been sent or when the reminder module 310 determines that all target cells 650 have been analyzed (block 514) without generating a reminder, the reminder module 310 determines whether more tasks remain on the task list 226 to be processed (block 516). If no other tasks remain, the process returns to monitoring the device's location (block 502). Otherwise, the next task is considered (block 518) and the process repeats at block 507 where the first target cell 650 is considered with respect to the next task.

As mentioned above, the tasks on the task list 226 can be listed in order of importance, time for completion, or any other suitable factor. Accordingly, the task reminder process can be performed for tasks according to their respective importance or completion time. The reminder module 310 can perform the process for a task with a highest priority, or it can process each of the tasks in order of decreasing priority.

Although the process above in FIG. 5 has been described for a task associated with one task location, the process can be applied equally to a task associated with more than one task location. For example, a task having two task locations located in two different task cells can be treated as two sub-tasks, and the process can be performed for each task location.

Figure 11:
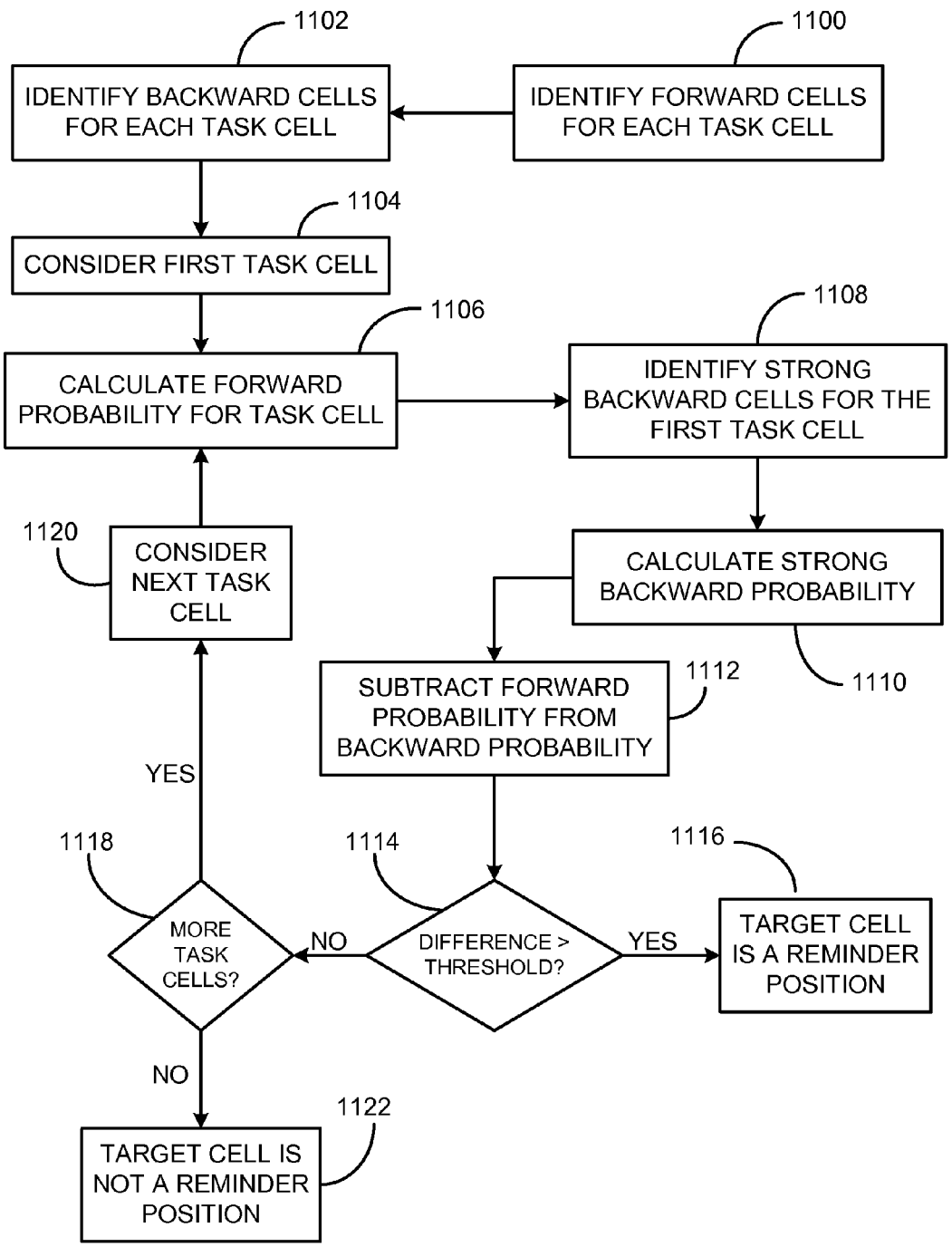
FIG. 11 is a flow diagram illustrating an exemplary process for determining whether a target cell is a reminder position according to another embodiment.

In another exemplary embodiment, the process can be performed once for a task associated with a plurality of task locations. In this embodiment, the process for determining whether the target cell 650 is a reminder position considers each of the task locations together. For example, FIG. 11 is a flowchart illustrating an exemplary process for determining whether a target cell 650 is a reminder position when a task is associated with a plurality of task locations according to an exemplary embodiment. The process begins when the target cell evaluator module 312 identifies one or more forward cells 660 for each of the task locations located in one or more task cells 620. (block 1100). In one embodiment, the forward cells 660 are identified in the same manner described above. Next, the target cell evaluator module 312 identifies one or more backward cells 670 for each of the task cells 620 (block 1102).

Once the forward cells 660 and backward cells 670 have been identified, the target cell evaluator module 312 considers a first of the plurality of task cells 620 (block 1104) and calculates a forward probability of the user 120 traveling from the target cell 650 in a trajectory leading toward the first task cell 620 (block 1106). In one embodiment, the forward probability is calculated by summing a number of times the user 120 has transitioned from the target cell 650 to any of the forward cells 660 associated with the first task cell 620 and dividing the sum by a total number of transitions from the target cell 650.

The target cell evaluator 312 then identifies one or more strong backward cells (block 1108). In this embodiment, a strong backward cell is a backward cell associated with the first task cell 620 that is not also identified as a forward cell 660 for any of the other task cells 620. The target cell evaluator module 312 then calculates a strong backward probability of the user 120 traveling from the target cell 650 in a trajectory leading away from the first task cell 620 (block 1110). In one embodiment, the strong backward probability is calculated by summing a number of times the user 120 has transitioned from the target cell 650 to any of the strong backward cells 660 associated with the first task cell 620 and dividing the sum by a total number of transitions from the target cell 650.

In an exemplary embodiment, the target cell evaluator 312 then subtracts the forward probability from the strong backward probability (block 1112) and compares the difference to the threshold value (block 1114). If the difference is greater than the threshold value, the target cell evaluator module 312 designates the target cell 650 as a reminder position (block 1116). Conversely, if the difference is less than the threshold value, the target cell evaluator module 312 determines whether more task cells 620 need to be analyzed (block 1118). If such is the case, the next task cell is considered (block 1120) and the process repeats at block 1106 where the forward probability for the next task cell 620 is calculated. When all the task cells 620 have been analyzed (block 1118) and none have resulted in a target cell designation, the target cell 650 is a reminder position (block 1122).

In another embodiment, instead of considering a task cell 650 individually, the target cell evaluator module 312 aggregates the task cells 650 and calculates an aggregate forward probability by summing the number of times the user 120 has transitioned from the target cell 650 to any of the one or more forward cells 660 associated with any task cell 620 and dividing the sum by the total transitions. Similarly, an aggregate backward probability is calculated by summing the number of times the user 120 has transitioned from the target cell 650 to any of the one or more backward cells 670 associated with any task cell 620 and dividing the sum by the total transitions. The aggregate forward probability is then subtracted from the aggregate backward probability and the difference is compared to the threshold value.

As stated above, when a reminder position is identified, the reminder module generates and sends a message including the task reminder to the user 120. In one embodiment, when the task reminder is sent, the device 110 receives the message via the communication interface 118 and the message is displayed to the user 120 on the device's user interface 121. The user 120 can respond to the task reminder explicitly and implicitly. In one embodiment, the user 120 can respond positively by explicitly "accepting" the reminder using the mobile communication device 110. Alternatively, or in addition to, the user 120 can implicitly respond positively by traveling to the task location within a certain time period after receiving the message and optionally remaining at or near the task location for a period of time. Similarly, the user 120 can respond negatively by explicitly "rejecting" the reminder or by moving away from the task location.

According to an exemplary embodiment, the reminder module 310 can receive or monitor the user's response to the task reminder and adjust the threshold value based on the user's response. For example, in one embodiment, the threshold value can be lowered when the user 120 responds positively to the reminder and can be increased when the user 120 responds negatively to the reminder. In another embodiment, the reminder module 310 can adjust the threshold value based on the importance of the task, as indicated explicitly or by name. For example, the threshold value can be lowered as the importance of the task increases. In yet another embodiment, the threshold value can be based on the time frame in which the task is to be completed where the threshold value is lowered as the time frame becomes smaller.

The executable instructions of a computer program as illustrated in FIG. 5, FIG. 9 and FIG. 11 can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain, store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium.

More specific examples (a non-exhaustive list) of the computer readable medium can include the following: a wired network connection and associated transmission medium, such as an ETHERNET transmission system, a wireless network connection and associated transmission medium, such as an IEEE 802.11 (a), (b), or (g) or a BLUETOOTH transmission system, a wide-area network (WAN), a local-area network (LAN), the Internet, an intranet, a portable computer diskette, a random access memory (RAM), a read only memory (ROM), an erasable programmable read only memory (EPROM or Flash memory), an optical fiber, a portable compact disc (CD), a portable digital video disc (DVD), and the like.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. An apparatus for providing a reminder of a task to be performed at a task location, the apparatus comprising:
    a monitoring module configured to monitor a location of a user via a mobile communication device associated with the user at predetermined time intervals for tracking historical travel information of the user;
    a data store for storing the user's historical travel information and for storing user specified task information that includes a task and a task location; and
    a reminder module configured to determine a reminder position as a position where an estimated probability of the user traveling from the reminder position at a particular time in a trajectory leading toward the task location exceeds an estimated probability of the user traveling from the reminder position at that same time in a trajectory leading away from the task location by a threshold value, and to generate a reminder for the task when the reminder position is identified.

2. The apparatus of claim 1 wherein the task location is in a region that comprises a plurality of contiguous cells, and wherein the monitoring module is configured to identify in which cell of the plurality of cells the user is located at the predetermined time intervals.

3. The apparatus of claim 2 wherein the user's historical travel information includes transition information for each cell of the plurality of cells, wherein the transition information of a cell includes respective numbers of times the user transitions from the cell to other cells.

4. The apparatus of claim 3 wherein the reminder generation module is configured to determine the reminder position by identifying a target cell that is within a predetermined distance of a current position of the user, identifying one or more forward cells that are in a trajectory leading from the target cell to the task location in a task cell, and identifying one or more backward cells that are in a trajectory from the target cell leading away from the task cell.

5. The apparatus of claim 4 wherein when the task cell and the target cell are aligned horizontally or vertically, the one or more forward cells are at least one of cells that lie on a horizontal or vertical line from the target cell to the task cell and cells that lie immediately adjacent to the horizontal line or the vertical line, and the one or more backward cells are reflections of the one or more forward cells.

6. The apparatus of claim 5 wherein the target cell is represented as an origin and each cell is represented by first and second cell coordinates and the task cell is represented by first and second task coordinates relative to the origin, and wherein the one or more forward cells are not the origin and at least one of:
    cells where a sum of absolute values of the cell coordinates is greater than zero and less than a sum of absolute values of the task coordinates and whose cell coordinates have the same polarity as the task coordinates when the task cell and the target cell are not aligned horizontally or vertically;
    cells where the first cell coordinate is at least equal to zero and at most equal to the first task coordinate and the second cell coordinate is at least equal to zero and at most equal to the second task coordinate when the first and second task coordinates are each at least equal to zero;
    cells where the first cell coordinate is at least equal to zero and at most equal to the first task coordinate and the second cell coordinate is at least equal to the second task coordinate and at most equal to zero when the first task coordinate is at least equal to zero and the second task coordinate is less than zero;
    cells where the first cell coordinate is at least equal to the first task coordinate and at most equal to zero and the second cell coordinate is at least equal to zero and at most equal to the second task coordinate when the first task coordinate is less than zero and the second task coordinate is at least equal to zero; and
    cells where the first cell coordinate is at least equal to the first task coordinate and at most equal to zero and the second cell coordinate is at least equal to the second task coordinate and at most equal to zero when the first and second task coordinates are less than zero.

7. The apparatus of claim 4 wherein the reminder module is configured to calculate a forward probability of the user traveling from the target cell in a trajectory leading toward the task position and to calculate a backward probability of the user traveling from the target cell in a trajectory leading away from the task position based on the transition information for the target cell.

8. The apparatus of claim 7 wherein the reminder module is configured to calculate the forward probability by summing a number of times the user has transitioned from the target cell to any of the one or more forward cells and dividing the sum by a total number of transitions from the target cell, and to calculate the backward probability by summing a number of times the user has transitioned from the target cell to any of the one or more backward cells and dividing the sum by the total number of transitions from the target cell.

9. The apparatus of claim 8 wherein the reminder module is configured to designate the target cell as a reminder position when the forward probability exceeds the backward probability by the threshold value.

10. The apparatus of claim 7 wherein the reminder module is configured to calculate the forward probability based on the number of times the user has traveled from the target cell to any of the one or more forward cells via one or more cells, and to calculate the backward probability based on the number of times the user has traveled from the target cell to any of the one or more backward cells via one or more cells.

11. The apparatus of claim 3 wherein the reminder generation module is configured to determine the reminder position by identifying one or more target cells, wherein a target cell is within a predetermined distance of a current position of the user and a probability of the user traveling from the current position to the target cell exceeds a minimum probability threshold, and analyzing the one or more target cells in descending order of their probability.

12. The apparatus of claim 4 wherein the target cell is further based on a current traveling pattern of the user.

13. The apparatus of claim 4 wherein the reminder module is further configured to transmit the reminder for the task to the user via the mobile communication device and to prevent a subsequent reminder for the task unless at least one of a predetermined time thereafter has expired, and a distance between the user and the task cell has not reduced to zero, but has exceeded a threshold distance that is greater than the predetermined distance.

14. The apparatus of claim 3 wherein the task is associated with a plurality of task locations located in one or more task cells and the reminder generation module is configured to determine the reminder position by identifying a target cell that is within a predetermined distance of a current position of the user, identifying one or more forward cells for each of the one or more task cells, wherein for each task cell, the one or more forward cells are in a trajectory leading from the target cell to the task cell, and identifying one or more backward cells for each of the one or more task cells, wherein for each task cell, the one or more backward cells are in a trajectory from the target cell leading away from the task cell.

15. The apparatus of claim 14 wherein the reminder module is further configured to identify for a first task cell of the one or more task cells one or more strong backward cells comprising backward cells associated with the first task cell that are not identified as forward cells for other of the one or more task cells, to calculate a forward probability of the user traveling from the target cell in a trajectory leading toward the first task cell by summing a number of times the user has transitioned from the target cell to any of the one or more forward cells associated with the first task cell and dividing the sum by a total number of transitions from the target cell, to calculate a backward probability of the user traveling from the target cell in a trajectory leading away from the first task cell by summing a number of times the user has transitioned from the target cell to any of the one or more strong backward cells and dividing the sum by the total number of transitions from the target cell, and to designate the target cell as a reminder position when the forward probability exceeds the backward probability by the threshold value.

16. The apparatus of claim 14 wherein the reminder module is further configured to calculate a forward probability of the user traveling from the target cell in a trajectory leading toward any task cell by summing a number of times the user has transitioned from the target cell to any of the one or more forward cells and dividing the sum by a total number of transitions from the target cell, to calculate a backward probability of the user traveling from the target cell in a trajectory leading away from any task cell by summing a number of times the user has transitioned from the target cell to any of the one or more backward cells and dividing the sum by the total number of transitions from the target cell, and to designate the target cell as a reminder position when the forward probability exceeds the backward probability by the threshold value.

17. The apparatus of claim 1 wherein the user specified task information includes a plurality of tasks and wherein the reminder module is configured to prioritize the plurality of tasks based on at least one of task importance and completion time, and to determine a reminder position for a task location associated with a task having a highest priority.

18. The apparatus of claim 17 wherein the reminder module is further configured to determine a reminder position for respective task locations associated with each of the plurality of tasks in order of decreasing priority.

19. The apparatus of claim 1 wherein the apparatus is a mobile communication device comprising:
a communication interface coupled to a network; and
a position locator system configured to identify the location of the mobile communication device.

20. The apparatus of claim 19 wherein the monitoring module is configured to query the position locator system to identify the location of the mobile communication device at least one of at a fixed sampling interval and at a sampling interval proportional to at least one of a velocity and an expected velocity of the mobile communication device.

21. The apparatus of claim 1, wherein the apparatus is a server comprising:
a communication interface for communicating with the mobile communication device associated with the user over a network and configured to receive user specified task information and the location of the mobile communication device.

22. A method of providing a reminder of a task to be performed at a task location, the method comprising:
monitoring a location of a user via a mobile communication device associated with the user at predetermined time intervals for tracking historical travel information of the user;
receiving user specified task information that includes a task and a task location;
storing the user's historical travel information and user specified task information in a data store;
determining a reminder position as a position where an estimated probability of the user traveling from the reminder position at a particular time in a trajectory leading toward the task location exceeds an estimated probability of the user traveling from the reminder position at that same time in a trajectory leading away from the task location by a threshold value; and
generating a reminder for the task when the reminder position is identified.

23. The method of claim 22 wherein the task location is in a region that comprises a plurality of contiguous cells, and wherein monitoring includes identifying in which cell of the plurality of cells the user is located at the predetermined time intervals.

24. The method of claim 23 wherein monitoring user's location includes collecting transition information for each cell of the plurality of cells, wherein the transition information of a cell includes respective numbers of times the user transitions from the cell to other cells.

25. The method of claim 24 wherein determining the reminder position includes:
identifying a target cell that is within a predetermined distance of a current position of the user;
identifying one or more forward cells that are in a trajectory leading from the target cell to the task location in a task cell; and
identifying one or more backward cells that are in a trajectory from the target cell leading away from the task cell.

26. The method of claim 25 wherein when the task cell and the target cell are aligned horizontally or vertically, identifying the one or more forward cells includes identifying at least one of cells that lie on a horizontal or vertical line from the target cell to the task cell and cells that lie immediately adjacent to the horizontal line or the vertical line, and identifying the one or more backward cells includes identifying cells that are reflections of the one or more forward cells.

27. The method of claim 26 wherein the target cell is represented as an origin and each cell is represented by first and second cell coordinates and the task cell is represented by first and second task coordinates relative to the origin, wherein the one or more forward cells are not the origin, and wherein identifying the one or more forward cells includes identifying at least one of:
- cells where a sum of absolute values of the cell coordinates is greater than zero and less than a sum of absolute values of the task coordinates and whose cell coordinates have the same polarity as the task coordinates when the task cell and the target cell are not aligned horizontally or vertically;
- cells where the first cell coordinate is at least equal to zero and at most equal to the first task coordinate and the second cell coordinate is at least equal to zero and at most equal to the second task coordinate when the first and second task coordinates are each at least equal to zero;
- cells where the first cell coordinate is at least equal to zero and at most equal to the first task coordinate and the second cell coordinate is at least equal to the second task coordinate and at most equal to zero when the first task coordinate is at least equal to zero and the second task coordinate is less than zero;
- cells where the first cell coordinate is at least equal to the first task coordinate and at most equal to zero and the second cell coordinate is at least equal to zero and at most equal to the second task coordinate when the first task coordinate is less than zero and the second task coordinate is at least equal to zero; and
- cells where the first cell coordinate is at least equal to the first task coordinate and at most equal to zero and the second cell coordinate is at least equal to the second task coordinate and at most equal to zero when the first and second task coordinates are less than zero.

28. The method of claim 25 wherein identifying the reminder position includes calculating a forward probability of the user traveling from the target cell in a trajectory leading toward the task position and calculating a backward probability of the user traveling from the target cell in a trajectory leading away from the task position based on the transition information for the target cell.

29. The method of claim 28 wherein calculating the forward probability includes summing a number of times the user has transitioned from the target cell to any of the one or more forward cells and dividing the sum by a total number of transitions from the target cell, and calculating the backward probability includes summing a number of times the user has transitioned from the target cell to any of the one or more backward cells and dividing the sum by the total number of transitions from the target cell.

30. The method of claim 29 wherein identifying the reminder position includes designating the target cell as a reminder position when the forward probability exceeds the backward probability by the threshold value.

31. The method of claim 28 wherein calculating the forward probability includes counting the number of times the user has traveled from the target cell to any of the one or more forward cells via one or more cells, and calculating the backward probability includes counting the number of times the user has traveled from the target cell to any of the one or more backward cells via one or more cells.

32. The method of claim 24 wherein determining the reminder position includes identifying one or more target cells, wherein a target cell is within a predetermined distance of a current position of the user and a probability of the user traveling from the current position to the target cell exceeds a minimum probability threshold, and analyzing the one or more target cells in descending order of their probability.

33. The method of claim 25 wherein identifying the target cell is further based on a current traveling pattern of the user.

34. The method of claim 25 further comprising transmitting the reminder for the task to the user via the mobile communication device and to preventing a subsequent reminder for the task unless at least one of a predetermined time thereafter has expired, and a distance between the user and the task cell has not reduced to zero, but has exceeded a threshold distance that is greater than the predetermined distance.

35. The method of claim 24 wherein the task is associated with a plurality of task locations located in one or more task cells and determining the reminder position includes:
- identifying a target cell that is within a predetermined distance of a current position of the user;
- identifying one or more forward cells for each of the one or more task cells, wherein for each task cell, the one or more forward cells are in a trajectory leading from the target cell to the task cell; and
- identifying one or more backward cells for each of the one or more task cells, wherein for each task cell, the one or more backward cells are in a trajectory from the target cell leading away from the task cell.

36. The method of claim 35 wherein determining the reminder position further includes:
- for a first task cell of the one or more task cells one or more strong backward cells comprising backward cells associated with the first task cell that are not identified as forward cells for other of the one or more task cells;
- calculating a forward probability of the user traveling from the target cell in a trajectory leading toward the first task cell by summing a number of times the user has transitioned from the target cell to any of the one or more forward cells associated with the first task cell and dividing the sum by a total number of transitions from the target cell;
- calculating a backward probability of the user traveling from the target cell in a trajectory leading away from the first task cell by summing a number of times the user has transitioned from the target cell to any of the one or more strong backward cells and dividing the sum by the total number of transitions from the target cell; and
- designating the target cell as a reminder position when the forward probability exceeds the backward probability by the threshold value.

37. The method of claim 35 wherein determining the reminder position further includes:
- calculating a forward probability of the user traveling from the target cell in a trajectory leading toward any task cell by summing a number of times the user has transitioned from the target cell to any of the one or more forward cells and dividing the sum by a total number of transitions from the target cell;
- calculating a backward probability of the user traveling from the target cell in a trajectory leading away from any task cell by summing a number of times the user has transitioned from the target cell to any of the one or more backward cells and
- dividing the sum by the total number of transitions from the target cell; and
- designating the target cell as a reminder position when the forward probability exceeds the backward probability by the threshold value.

38. The method of claim 22 wherein the user specified task information includes a plurality of tasks and wherein the method further comprises prioritizing the plurality of tasks based on at least one of task importance and completion time, and determining the reminder position for a task location associated with a task having a highest priority.

39. The method of claim 38 wherein the method further includes determining a reminder position for respective task locations associated with each of the plurality of tasks in order of decreasing priority.

40. The method of claim 22 wherein the monitoring includes identifying the location of the mobile communication device at least one of at a fixed sampling interval and at a sampling interval proportional to at least one of a velocity and an expected velocity of the mobile communication device.

41. A computer readable storage medium having stored program instructions for providing a reminder of a task to be performed at a task location, the stored program instructions for performing a method comprising:
- monitoring a location of a user via a mobile communication device associated with the user at predetermined time intervals for tracking historical travel information of the user;
- receiving user specified task information that includes a task and a task location;
- storing the user's historical travel information and user specified task information in a data store;
- determining a reminder position as a position where an estimated probability of the user traveling from the reminder position at a particular time in a trajectory leading toward the task location exceeds an estimated probability of the user traveling from the reminder position at that same time in a trajectory leading away from the task location by a threshold value; and
- generating a reminder for the task when the reminder position is identified.

42. An apparatus for providing a reminder of a task to be performed at a task location, the apparatus comprising:
- means for monitoring a location of a user via a mobile communication device associated with the user at predetermined time intervals for tracking historical travel information of the user;
- means for receiving user specified task information that includes a task and a task location;
- means for storing the user's historical travel information and user specified task information; and
- means for generating a reminder of the task when a reminder position is determined, wherein the reminder position is a position where an estimated probability of the user traveling from the reminder position at a particular time in a trajectory leading toward the task location exceeds an estimated probability of the user traveling from the reminder position at that same time in a trajectory leading away from the task location by a threshold value.

\* \* \* \* \*